(12) United States Patent
Hsiu et al.

(10) Patent No.: US 6,549,262 B2
(45) Date of Patent: Apr. 15, 2003

(54) IN-LINE OPERATION SYSTEM AND FLOW PLAN FOR MANUFACTURING LIQUID CRYSTAL DISPLAY

(75) Inventors: Lin Yen Hsiu, Tainan Hsien (TW); Ishii Mikiyasu, Taipei (TW)

(73) Assignees: Quanta Display Inc., Tauyuan (TW); Sharp Corporation, Osaka (JP)

( * ) Notice: Subject to any disclaimer, the term of this patent is extended or adjusted under 35 U.S.C. 154(b) by 0 days.

(21) Appl. No.: 10/215,584

(22) Filed: Aug. 8, 2002

(65) Prior Publication Data

US 2002/0191147 A1 Dec. 19, 2002

Related U.S. Application Data

(62) Division of application No. 09/776,959, filed on Feb. 6, 2001, now Pat. No. 6,498,637.

(30) Foreign Application Priority Data

Dec. 26, 2000 (TW) .................................. 89127829 A

(51) Int. Cl.[7] .................................................. G02F 1/13
(52) U.S. Cl. ......................................................... 349/187
(58) Field of Search ................................... 349/158, 187

(56) References Cited

U.S. PATENT DOCUMENTS 5,929,962 A * 7/1999 Chiu et al. .................. 349/187
5,943,113 A * 8/1999 Ichihashi ..................... 349/187

* cited by examiner

Primary Examiner—Tarifur R. Chowdhury
(74) Attorney, Agent, or Firm—J.C. Patents

(57) ABSTRACT

An in-line operation for manufacturing liquid crystal displays. First, a liquid crystal cell is pulled out from a first stocking region and placed inside a processing station by a loader. The liquid crystal cell is shunt, beveled and corner-cut by a shunt and bevel unit inside the processing station. The liquid crystal cell is next transferred directly to a brush-washing unit for cleaning. After cleaning, the semi-finished product is directly transferred from a linked stocking region to an affixing unit for attaching a polarizer onto the liquid crystal cell. The semi-finished product is transferred to a second stocking region by an unloader. Sample inspection can be carried out when the semi-finished product is still within the linked stocking region.

2 Claims, 5 Drawing Sheets

IN-LINE OPERATION SYSTEM AND FLOW PLAN FOR MANUFACTURING LIQUID CRYSTAL DISPLAY

This application is a divisional application of, and claims the priority benefit of, U.S. application Ser. No. 09/776,959 filed on Feb. 6, 2001, now U.S. Pat. No. 6,498,637.

CROSS-REFERENCE TO RELATED APPLICATION

This application claims the priority benefit of Taiwan application serial no. 89127829, filed Dec. 26, 2000.

BACKGROUND OF THE INVENTION

1. Field of Invention

The present invention relates to a method of manufacturing liquid crystal display (LCD). More particularly, the present invention relates to an in-line operation system and flow plan for manufacturing liquid crystal display.

2. Description of Related Art

Liquid crystal display (LCD) is incorporated into a variety of consumer electronic and computer products such as portable televisions, mobile telephones, camcorders, notebook computers, desktop monitors and projection televisions. Major advantages of a LCD include its high-quality picture, light and streamline body, low voltage driver and low power consumption. Hence, LCD is gradually replacing cathode ray tube (CRT) as the preferred means of display.

The main body of a liquid crystal display is a liquid crystal unit consisting of two transparent panels and a layer of liquid crystal between the panels. At present, thin film transistor (TFT) is the dominant type of liquid crystal display. In general, the manufacturing of a TFT type LCD can be grouped into three stages: the production of the thin film transistor (TFT) array, the assembly of the liquid crystal cell and the fabrication of the liquid crystal module.

In the production of a TFT LCD, the production of a TFT array includes producing a thin film transistor panel. The assembly of the liquid crystal unit includes joining two thin film transistor panels together and injecting liquid crystal into the space between the panels to form a liquid crystal unit. The fabrication of the liquid crystal module includes attaching a polarizer to the liquid crystal display panel, connecting the circuit inside the liquid crystal display panel with a driver IC and installing of reflectors or back lights. Finally, burn-in testing is conducted after the module is formed.

At present, off-line operation is employed in the production of a liquid crystal display from liquid crystal cell assembly to liquid crystal module assembly. FIG. 1 is a flow chart showing the steps in a conventional off-line operation method for fabricating liquid crystal display from the assembly of liquid crystal cell to the assembly of liquid crystal module. As shown in step 100 of FIG. 1, the semi-finished product after liquid crystal is sealed in the space between liquid crystal panels is placed in a first stocking region. In step 102, the semi-finished product is pulled by a loader from the first stocking region. In step 104, the completely assembled liquid crystal cell is shunt-separated, beveled and corner-cut. In step 106, cullets that form due to the cutting, the beveling and the corner smoothing operations are removed. In step 108, the semi-finished is further cleaned by brush washing. In step 110, the semi-finished product is placed in a second stocking region using an unloader.

As shown in FIG. 1, the semi-finished product is pulled from the second stocking region in step 112 to perform a visual inspection after completing the steps for producing a liquid crystal cell. In step 114, the semi-finished product is placed in a third stocking region ready so that the semi-finished product can be pulled from the third stocking region when liquid crystal module needs to be fabricated. Hence, between the assembly of the liquid crystal cell and the assembly of the liquid crystal module, the semi-finished product is unloaded from the production line and stored in a stocking buffer, typical for an off-line operation.

To fabricate the liquid crystal module as shown in FIG. 1, the inspected liquid crystal display cell is pulled out from the third stocking region by a loader in step 116. In step 118, the liquid crystal cell is brush-washed to clean all the exposed surfaces. In step 120, a polarizer is affixed to the surface of the liquid crystal cell. In step 122, the semi-finished product is unloaded from the production line to a fourth stocking region ready for subsequent use.

However, because of the selection of off-line operation between the assembly of the liquid crystal cell and the assembly of liquid crystal module, a production line with a length of at least 50 m to 60 m is required.

SUMMARY OF THE INVENTION

Accordingly, one object of the present invention is to provide an in-line operation installation and flow plan that uses a linked stocking region to directly connect the assembly line for producing liquid crystal cell and the assembly line for producing liquid crystal module. By automating the transfer of semi-finished product between the two assembly lines, the number of stocking regions, processing machines and operators needed in the production line is reduced. By carrying out a single brush washing instead of a cullet cleaning and a brush washing operation, length of the production line can be reduced without affecting product yield. In addition, by linking an inspection cell with a connected stocking region, the semi-finished product can be inspected on line rather than off line in a full visual inspection. Without off line inspection, production time and area needed for production are reduced. Hence, product cycle is reduced, product yield is increased and production line administration is simplified.

This invention also provides an in-line operation for manufacturing liquid crystal displays. First, a liquid crystal cell is pulled out from a first stocking region and placed inside a processing station by a loader. The liquid crystal cell is shunt, beveled and corner-cut by a shunt and bevel unit inside the processing station. The liquid crystal cell is next transferred directly to a brush-washing unit for cleaning. After cleaning, the semi-finished product is directly transferred from a linked stocking region to an affixing unit for attaching a polarizer onto the liquid crystal cell. The semi-finished product is transferred to a second stocking region by an unloader. Sample inspection can be carried out when the semi-finished product is still within the linked stocking region. The inspected semi-finished product passing through the linked stocking region can be brush-washed a second time before transferring to the affixing unit for attaching a polarizer. The second brush-washing unit is inserted between the linked stocking region and the affixing unit.

In addition, this invention provides an in-line operation system that includes a stocking region for holding liquid crystal cell, a shunt and bevel unit, a brush-washing unit, a linked stocking region, an affixing unit, an inspection unit and a second stocking region for holding semi-finished liquid crystal module. The brush-washing unit, the inspection unit, the shunt and bevel unit, the linked stocking region are joined together. Furthermore, the shunt and bevel unit may include a directly attached loader while the affixing unit may include a directly attached unloader. A second brush-washing unit that joins up directly with the affixing unit and the linked stocking region may be added.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
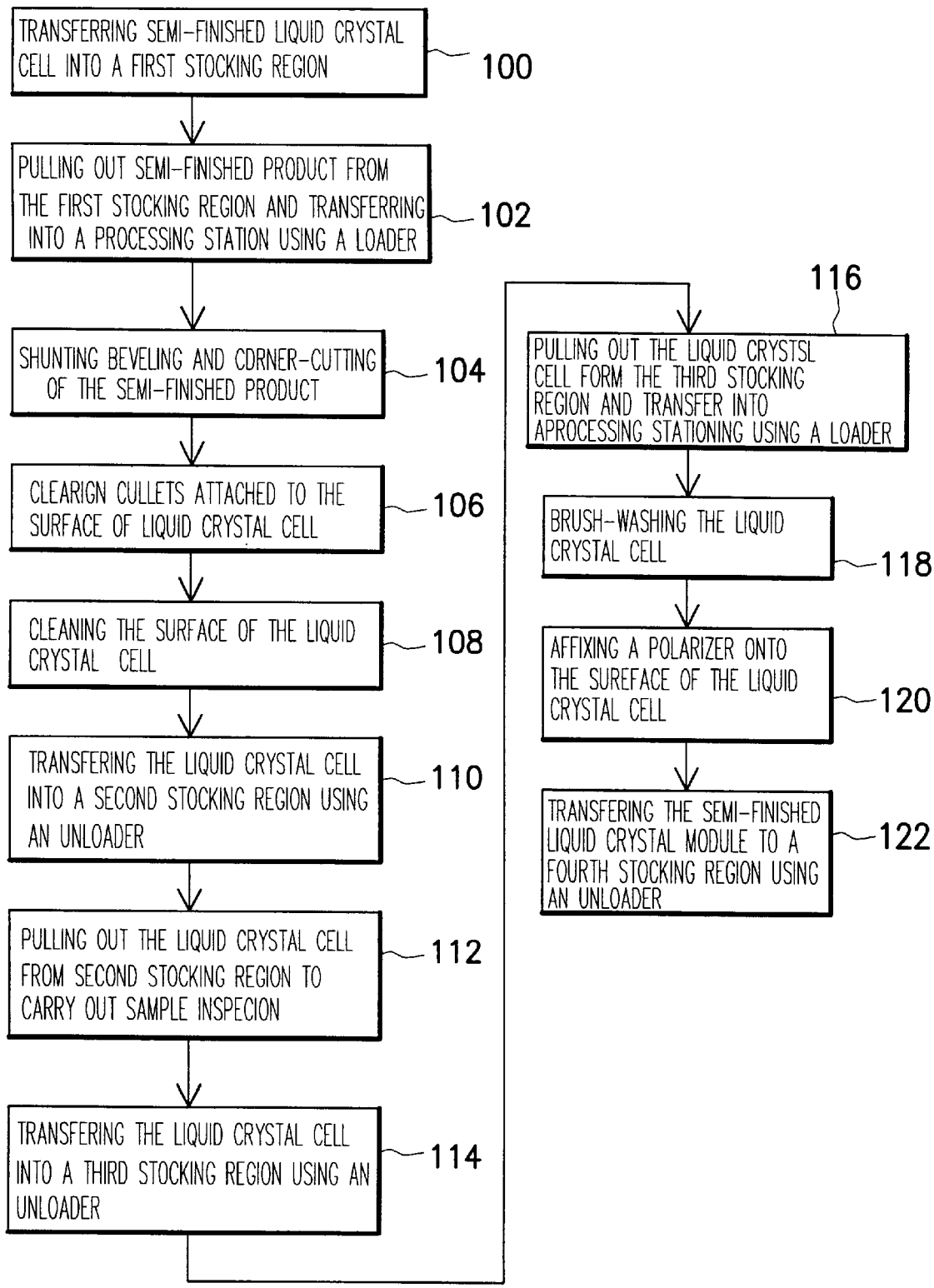
FIG. 1 is a flow chart showing the steps in a conventional off-line operation for fabricating liquid crystal display from the assembly of liquid crystal cell to the assembly of liquid crystal module.

Reference will now be made in detail to the present preferred embodiments of the invention, examples of which are illustrated in the accompanying drawings. Wherever possible, the same reference numbers are used in the drawings and the description to refer to the same or like parts.

Figure 2:
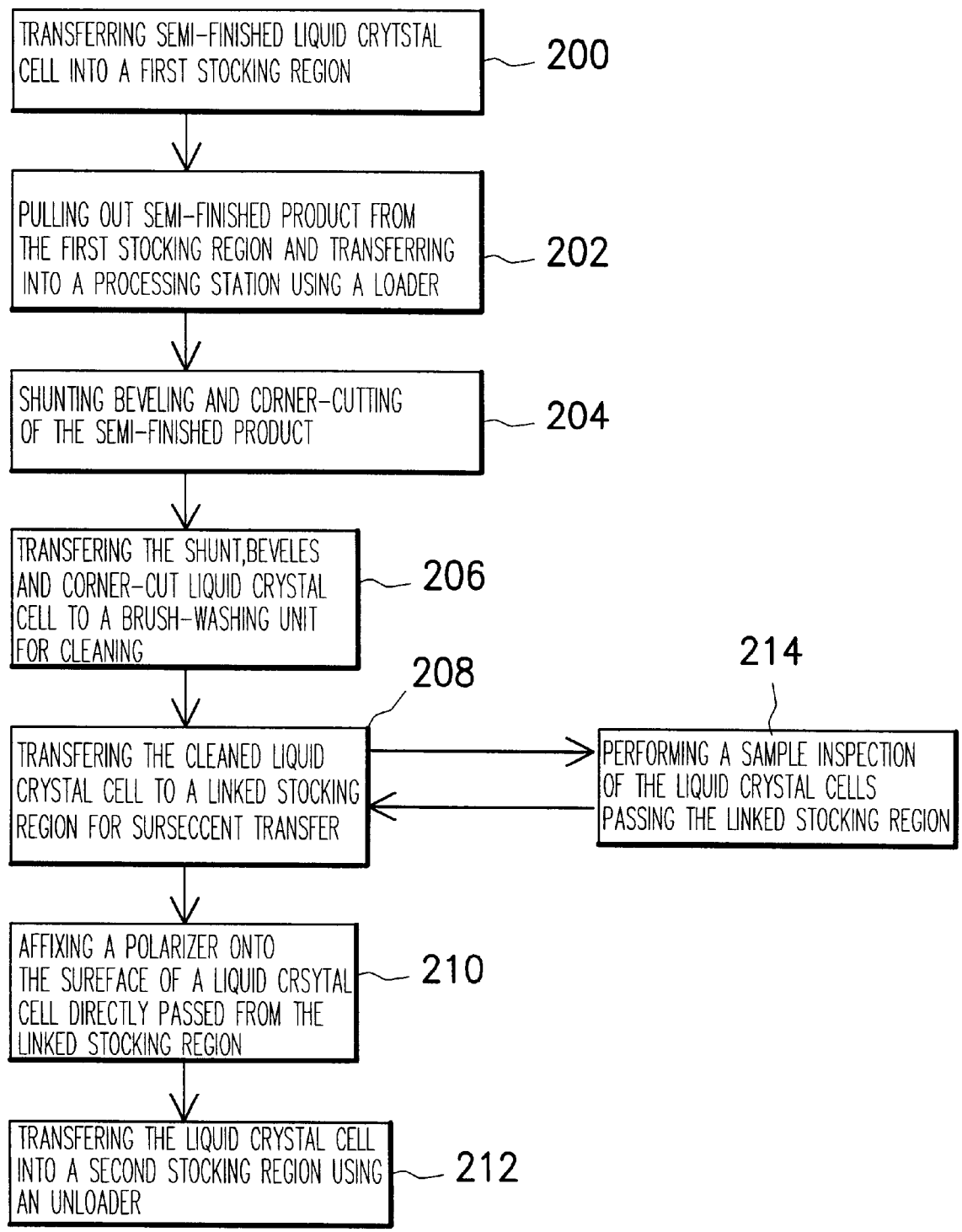
FIG. 2 is a flow chart showing the steps in an on-line operation for fabricating liquid crystal display by integrating the assembly of liquid crystal cell and liquid crystal module according to a first preferred embodiment of this invention.
Figure 3:
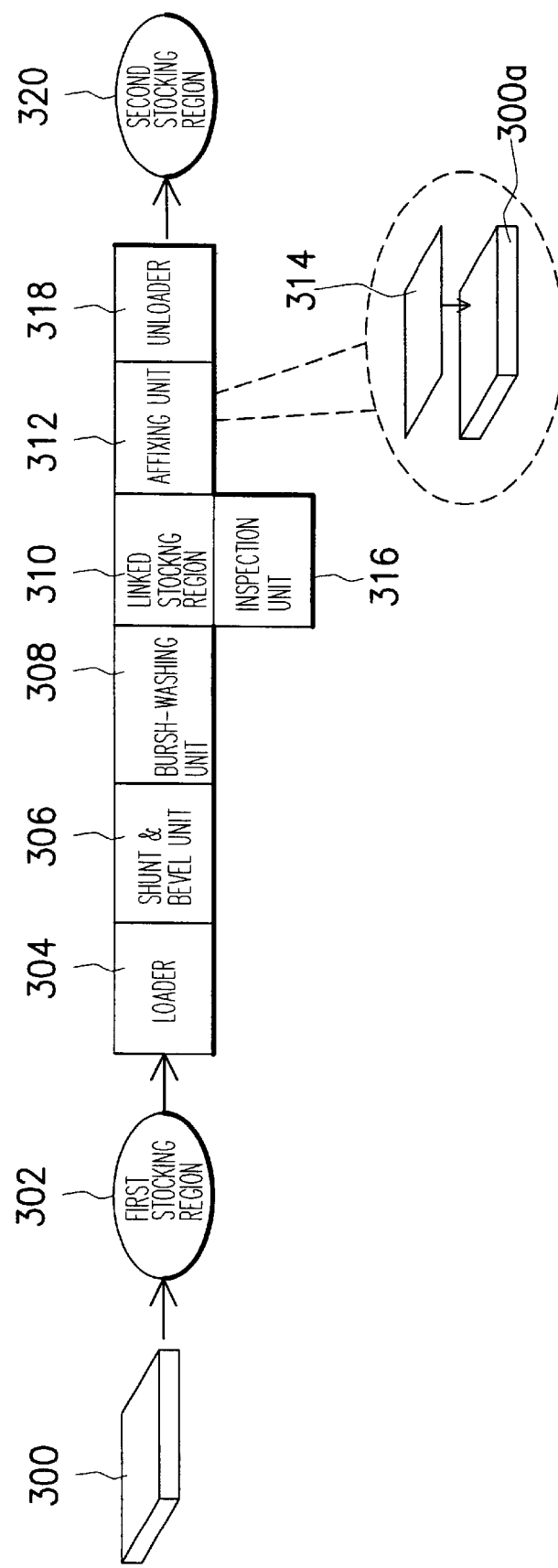
FIG. 3 is a schematic diagram showing an on-line operation system for fabricating liquid crystal display by integrating the assembly of liquid crystal cell and liquid crystal module according to the first preferred embodiment of this invention.

FIG. 2 is a flow chart showing the steps in an on-line operation for fabricating liquid crystal display by integrating the assembly of liquid crystal cell and liquid crystal module according to a first preferred embodiment of this invention. FIG. 3 is a schematic diagram showing an on-line operation system for fabricating liquid crystal display by integrating the assembly of liquid crystal cell and liquid crystal module according to the first preferred embodiment of this invention.

In this invention, some of the steps for assembling a liquid crystal cell are similar to the conventional technique. When the liquid crystal is sealed inside liquid crystal display panels, fabrication of the liquid crystal cell is considered complete. As shown in FIGS. 2 and 3, a liquid crystal cell 300 is placed into a first stocking region 302 in step 200. To carry out subsequent processing, the liquid crystal cell 300 is pulled out from the first stocking region 302. The first stocking region 302, for example, can be the interior of an automatic stocking machine.

In step 202, a loader 304 is used to pull out the semi-finished liquid crystal cell 300 from the first stocking region 302. In step 204, the semi-finished liquid crystal cell 300 is transferred by the loader 304 into a shunting and beveling unit 306. Inside the shunting and beveling unit 306, the liquid crystal cell 300 is shunt, beveled and corner-cut. The shunt and bevel unit 306 and the loader 304 are directly joined together.

In step 206, the shunt, beveled and corner-cut semi-finished liquid crystal cell is transferred directly from the shunt and bevel unit 306 to a brush-washing unit 308. Any cullets formed on the liquid crystal cell inside the shunt and bevel unit 306 are cleared away. The brush-washing unit 308 and the shunt and bevel unit 306 are directly joined together. This invention uses a single brush-washing step 206 to replace the conventional method of performing a cullet-cleaning in step 106 and performing a brush washing in step 108 as shown in FIG. 1. Hence, one cullet-cleaning step is saved. In step 208, the brush-washed semi-finished product is directly transferred from the brush-washing unit 308 to a linked stocking region 310. From the linked stocking region 310, the semi-finished product is distributed to other processing unit. The linked stocking region 310 and the brush-washing unit 308 are directly joined together. In addition, the interior of the linked stocking region 310 has clean-room control facilities.

In step 210, the liquid crystal cell is directly transferred from the linked stocking region 310 to an affixing unit 312. Inside the affixing unit 312, a polarizer 314 is attached to one of the liquid crystal cell surface 300a to carry out liquid crystal module assembly. The affixing unit 312 and the linked stocking region 310 are directly joined together.

One major aspect of this invention is the joining of the brush-washing unit with the affixing unit through the linked stocking region. Hence, the liquid crystal cell assembly line and the liquid crystal module assembly line are merged together. Consequently, the brush-cleaned semi-finished products can be directly transferred from the brush-washing unit to the affixing unit. The automatic transfer of semi-finished product between the liquid crystal cell assembly line and the liquid crystal module assembly line is what constitutes the in-line operation method according to this invention.

In addition, the linked stocking region 310 and an inspection unit 316 are directly joined together as shown in FIG. 3. A sample inspection such as a visual check of the semi-finished liquid crystal display can be carried out in the inspection unit 316 in step 214. Any product containing defects is removed from the production line for further treatment or rework. After treatment or rework, the semi-finished product can be returned to the inspection unit 316. After proper inspection in the inspection unit 316, the semi-finished product is transferred to the linked stocking region 310 to continue with the remaining processing steps. Furthermore, if there are errors in any one of the processing steps, the semi-finished products on the production line can be removed from the linked stocking region 310. When the cause of error is removed, the reworked semi-finished product can be returned to the linked stocking region 310 so that the remaining operations can be carried out.

In step 212, the polarizer affixed semi-finished product is pulled out from the affixing unit 312 and transferred to a second stocking region 320 by an unloader 318. The unloader 318 and the affixing unit 312 are directly joined together. The second stocking region 320 is a stocking region for semi-finished products. For example, the second stocking region 320 can be an automatic stocking machine.

Figure 4:
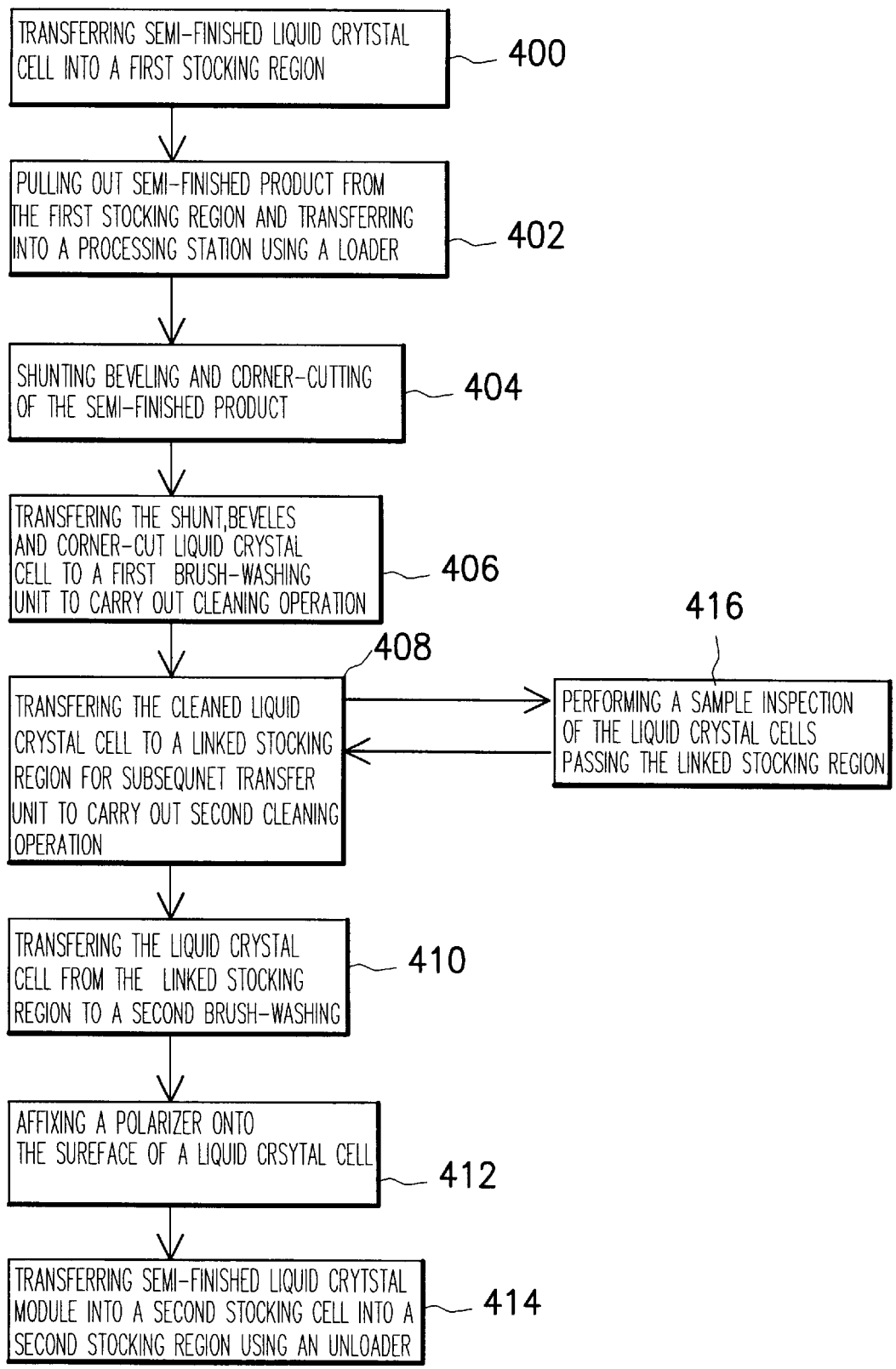
FIG. 4 is a flow chart showing the steps in an on-line operation for fabricating liquid crystal display by integrating the assembly of liquid crystal cell and liquid crystal module according to a second preferred embodiment of this invention.
Figure 5:
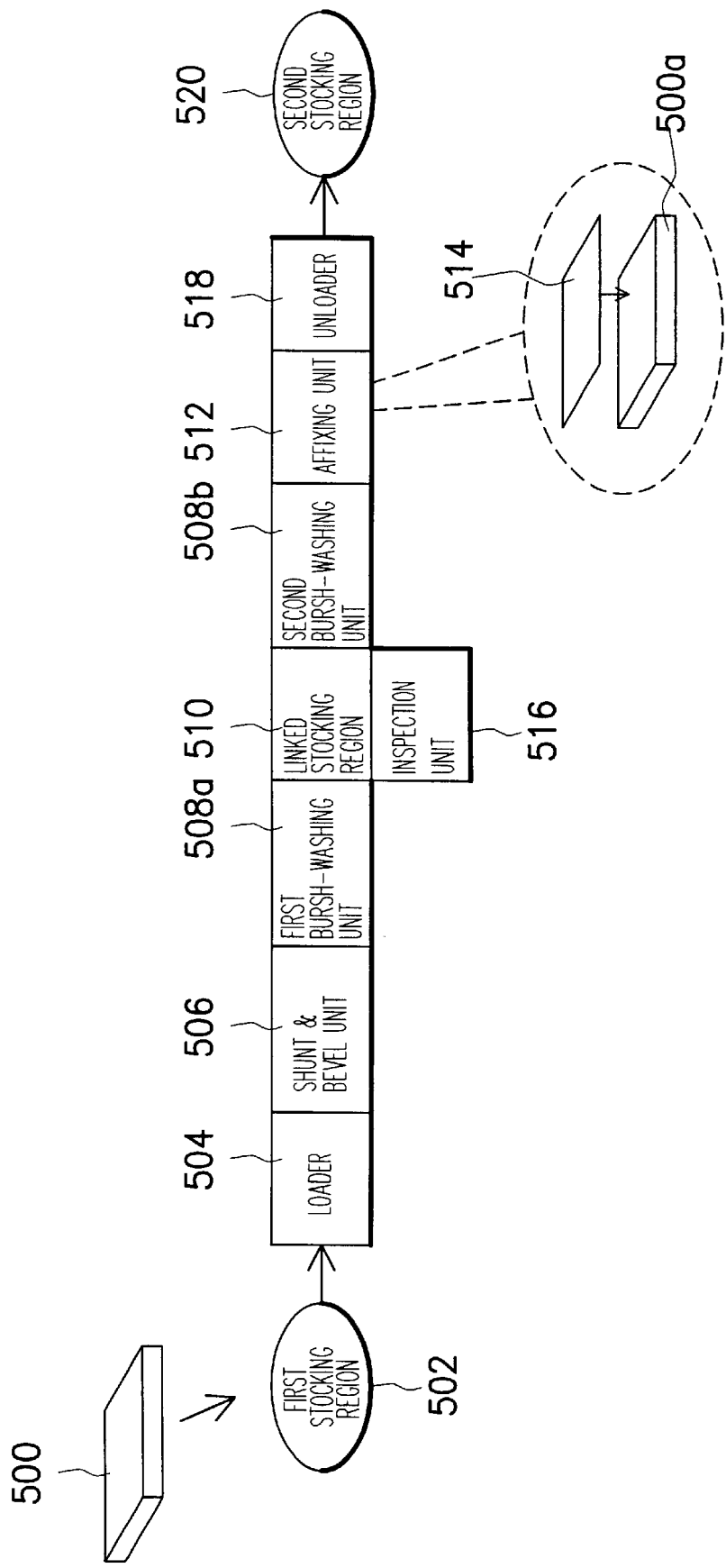
FIG. 5 is a schematic diagram showing an on-line operation system for fabricating liquid crystal display by integrating the assembly of liquid crystal cell and liquid crystal module according to the second preferred embodiment of this invention.

FIG. 4 is a flow chart showing the steps in an on-line operation for fabricating liquid crystal display by integrating the assembly of liquid crystal cell and liquid crystal module according to a second preferred embodiment of this invention. FIG. 5 is a schematic diagram showing an on-line operation system for fabricating liquid crystal display by integrating the assembly of liquid crystal cell and liquid crystal module according to the second preferred embodiment of this invention.

In the second embodiment of this invention, a portion of the steps in the liquid crystal cell assembly and liquid crystal module assembly is identical to the first embodiment. When the liquid crystal is sealed inside liquid crystal display panels, fabrication of the liquid crystal cell is considered complete. As shown in FIGS. 4 and 5, a liquid crystal cell 500 is placed into a first stocking region 502 in step 400. To carry out subsequent processing, the liquid crystal cell 500 is pulled out from the first stocking region 502. The first stocking region 502, for example, can be the interior of an automatic stocking machine.

In step 402, a loader 504 is used to pull out the semi-finished liquid crystal cell 500 from the first stocking region 502. In step 404, the semi-finished liquid crystal cell 500 is transferred by the loader 504 into a shunting and beveling unit 506. Inside the shunting and beveling unit 506, the liquid crystal cell 500 is shunt, beveled and corner-cut. The shunt and bevel unit 506 and the loader 504 are directly joined together.

In step 406, the shunt, beveled and corner-cut semi-finished liquid crystal cell is transferred directly from the shunt and bevel unit 506 to a first brush-washing unit 508a. Any cullets formed on the liquid crystal cell inside the shunt and bevel unit 506 are cleared away. The first brush-washing unit 508a and the shunt and bevel unit 506 are directly joined together. In this embodiment, a single brush-washing step is used instead of the conventional method of performing cullet-cleaning brush washing as shown in FIG. 1 to save one cullet-cleaning step. In step 408, the brush-washed semi-finished product is directly transferred from the first brush-washing unit 508a to a linked stocking region 510. From the linked stocking region 510, the semi-finished product is distributed to other processing unit. The linked stocking region 510 and the first brush-washing unit 508a are directly joined together. In addition, the interior of the linked stocking region 510 has clean-room control facilities.

In step 410, the liquid crystal cell is directly transferred from the linked stocking region 510 to a second brush-washing unit 508b. Inside the second brush-washing unit 508b, surface of the liquid crystal cell is thoroughly cleansed. The second brush-washing unit 508b, similar to the first brush-washing unit 508a, is directly joined with the linked stocking region 510. Similar to the first embodiment, the liquid crystal cell assembly line and the liquid crystal module assembly line are integrated together through the joining of the first brush-washing unit, the linked stocking region and the second brush-washing unit. The automatic transfer of semi-finished product between the liquid crystal cell assembly line and the liquid crystal module assembly line is what constitutes the in-line operation method according to this invention.

In step 412, the cleaned liquid crystal cell is directly transferred from the second brush-washing unit 508b to an affixing unit 512. Inside the affixing unit 512, a polarizer 514 is attached to one of the liquid crystal cell surface 500a to carry out liquid crystal module assembly. The affixing unit 512 and the second brush-washing unit 508b are directly joined together.

Similar to the first embodiment, the linked stocking region 510 and an inspection unit 516 are directly joined together as shown in FIG. 3. A sample inspection such as a visual check of the semi-finished liquid crystal display can be carried out in the inspection unit 516 in step 416. Any product containing defects is removed from the production line for further treatment or rework. After treatment or rework, the semi-finished product can be returned to the inspection unit 516. After proper inspection in the inspection unit 516, the semi-finished product is transferred to the linked stocking region 510 to continue with the remaining processing steps.

In step 414, the polarizer affixed semi-finished product is pulled out from the affixing unit 512 and transferred to a second stocking region 520 by an unloader 518. The unloader 518 and the affixing unit 512 are directly joined together. The second stocking region 520 is a stocking region for semi-finished products. For example, the second stocking region 520 can be an automatic stocking machine.

According to the embodiment of this invention, the advantages of this invention can be summarized as follows:

1. The in-line operation of this invention uses a linked stocking region to integrate the liquid crystal cell assembly line and the liquid crystal module assembly line together. Hence, semi-finished products can be automatically transferred between the two assembly lines, thereby saving a few automatic stocking machines, a number of loaders and unloaders for off-line operation, operators and hence reducing equipment and production cost.

2. This invention not only uses the linked stocking region to join the liquid crystal cell assembly line and the liquid cell module assembly line, but also uses a single brush-washing step instead of separate cullet-cleaning and brush-washing step. Therefore, a cullet-cleaning machine is saved without affecting product quality. Since overall length of the production line is somewhere between 25 m to 30 m, the cost of investment, production management, production cycle is reduced.

3. By joining the linked stocking region with an inspection cell, the semi-finished product passing the linked stocking region can be visually inspected without having to provide space and time for off-line inspection. Thus, production cost is reduced and product yield is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An in-line operation system for fabricating a liquid crystal display, comprising:

a loader for pulling out a plurality of liquid crystal cells from a first stocking region;

a shunt and bevel unit joined directly with the loader for shunting, beveling and corner-cutting each liquid crystal cell;

a first brush-washing unit joined directly with the shunt and bevel unit for brush-cleaning each passing liquid crystal cell;

a linked stocking region joined directly with the first brush-washing unit for transferring each liquid crystal cell;

a second brush-washing unit joined directly with the linked stocking region for brush-cleaning each passing liquid crystal cell;

an affixing unit joined directly with the second brush-washing unit for attaching a plurality of polarizers onto the respective surface of each liquid crystal cell; and an unloader joined directly with the affixing unit for transferring the polarizer-attached liquid crystal cell to a second stocking region.

2. The in-line operation system of claim 1, wherein the system further includes an inspection unit joined directly with the linked stocking region for inspecting the passing liquid crystal cell.

* * * * *